United States Patent
Belser et al.

(10) Patent No.: US 11,026,284 B1
(45) Date of Patent: Jun. 1, 2021

(54) CONTROLLING RADIO-BEARER SETUP BASED ON HISTORY OF RADIO-BEARER-SETUP FAILURE

(71) Applicant: Sprint Spectrum L.P., Overland Park, KS (US)

(72) Inventors: John E. Belser, Olathe, KS (US); Paul M. Andreas, Overland Park, KS (US); Rodney D. Nelson, Overland Park, KS (US); Mark D. Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/268,231

(22) Filed: Feb. 5, 2019

(51) Int. Cl.
| | |
|---|---|
| *H04W 76/18* | (2018.01) |
| *H04W 76/27* | (2018.01) |
| *H04L 29/06* | (2006.01) |
| *H04W 12/08* | (2021.01) |
| *H04W 92/10* | (2009.01) |

(52) U.S. Cl.
CPC ............. *H04W 76/18* (2018.02); *H04L 69/28* (2013.01); *H04W 76/27* (2018.02); *H04W 12/08* (2013.01); *H04W 92/10* (2013.01)

(58) Field of Classification Search
CPC ..... H04W 76/18; H04W 76/27; H04W 92/10; H04W 12/08; H04L 69/28
USPC .................................................. 370/242, 225
See application file for complete search history.

(56) References Cited

U.S. PATENT DOCUMENTS

| | | | |
|---|---|---|---|
| 9,288,711 B1 | 3/2016 | Marupaduga et al. | |
| 9,820,331 B1* | 11/2017 | Singh | H04W 76/18 |
| 10,098,039 B1* | 10/2018 | Manchanda | H04W 28/14 |
| 2005/0271029 A1* | 12/2005 | Iffland | H04L 43/50 |
| | | | 370/348 |
| 2012/0295617 A1 | 11/2012 | Anchan et al. | |
| 2015/0082444 A1* | 3/2015 | Rogers | H04W 12/003 |
| | | | 726/26 |
| 2016/0029228 A1* | 1/2016 | Mufti | H04W 24/04 |
| | | | 370/225 |
| 2020/0107335 A1* | 4/2020 | Xue | H04W 76/27 |

OTHER PUBLICATIONS

Technology Planet, "KPI Optimization: LTE ERAM Success Rate," printed from the World Wide Web https://ourtechplanet.com/lte-erab-success-rate/, Oct. 11, 2017.

* cited by examiner

*Primary Examiner* — Kwang B Yao
*Assistant Examiner* — Syed M Bokhari

(57) ABSTRACT

A timeout period for a base station to wait for a UE's response to bearer-setup messaging from the base station will be set based on an evaluation of how often the UE (or a class of UEs of which the UE is a member) has experienced bearer-setup failures. For instance, the base station could generally apply a default timeout period for waiting to receive bearer-setup response messaging from UEs. But for a given UE that has recently experienced a high rate of bearer-setup failures, the base station could apply a longer timeout period, to help cope with that UE's tendency to be slower to respond to the base station's bearer-setup messaging.

20 Claims, 5 Drawing Sheets

CONTROLLING RADIO-BEARER SETUP BASED ON HISTORY OF RADIO-BEARER-SETUP FAILURE

BACKGROUND

A wireless communication system typically includes a number of base stations that are each configured to provide service in one or more cells where user equipment devices (UEs) such as cell phones, tablet computers, tracking devices, embedded wireless modules, and other wirelessly equipped communication devices (whether or not user controlled), can operate. In turn, each base station could be coupled with a core-network that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each cell of such a system could operate in accordance with a particular radio access technology, with air-interface communications from the base stations to UEs defining a downlink or forward link and air-interface communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

Overview

In a representative system, when a UE initially enters into sufficiently strong coverage of a base station, the UE and base station may engage in signaling to establish a connection with the base station, and the UE may engage in signaling via the base station with a core-network control entity to attach, or register, for service.

By way of example, upon detecting threshold strong coverage of the base station, the UE could transmit a random-access message to the base station, the base station could responsively transmit to the UE a random-access-response message providing an initial uplink resource grant. The UE could then use the resource grant to transmit to the base station a Radio Resource Control (RRC) connection request seeking to establish an RRC connection between the UE and the base station, the base station could respond with an RRC connection-setup message creating a signaling radio bearer (SRB) between the base station and the UE, and the UE could in turn respond with an RRC connection-setup-complete message that signals the setup of the RRC connection.

Within the RRC connection-setup-complete message, the UE could also include an attach request destined to a core-network control entity, and the base station could forward the attach request along to the control entity as an initial UE attach message that also includes a request for the control entity to set up packet-data network connectivity for the UE. In response, the control entity could then coordinate setup for the UE of a core-network bearer extending between the base station and a packet-data network gateway. And the control entity could transmit to the base station an initial-context-setup request for the UE, specifying bearer parameters such as maximum bit rate, so that the base station can reserve appropriate radio resources to serve the UE.

In response to the initial-context-setup request for the UE, the base station could then engage in a process to configure for the UE a default radio bearer (DRB) between the UE and the base station.

As part of this process, the base station could transmit to the UE one or more bearer-setup messages, and the UE could respond to each such message. For instance, the base station could transmit to the UE a security-command message that provides the UE with security information (such as integrity and ciphering algorithms or the like) useable to facilitate secure communication between the UE and the base station, and an RRC connection-reconfiguration message that directs the UE to add the DRB to the UE's RRC connection. And the UE could responsively add the DRB to its RRC connection and configure the security parameters as indicated and could respond to the base station with a security-mode-complete message and an RRC connection-reconfiguration-complete message.

Further, once the base station receives the UE's affirmative response to each such bearer-setup message, the base station could respond to the control entity's initial-context-setup message to facilitate completion of the UE's attachment process. For instance, once the base station has received the UE's security-mode-complete message and RRC connection-reconfiguration complete message, the base station could send to the control entity an initial-context-setup response. This initial-context-setup response could carry a base-station tunnel-endpoint identifier that the control entity could use as a basis to finish setup of a core-network bearer for the UE as part of the UE's attachment. And the UE could then transmit an attach-complete message via the base station to the control entity, which could signal successful completion of the UE's attachment.

In the representative implementation of this process, the base station could be configured to wait for up to a predefined timeout period to receive from the UE a response to each of the base station's bearer-setup messages, such as a security-mode-complete message in response to the base station's security-mode-command message and to receive from the UE an RRC connection-reconfiguration-complete message in response to the base station's RRC connection-reconfiguration message. The base station could then deem the DRB-setup process to have either succeeded or failed based on whether the base station receives each such response from the UE before expiration to the timeout period, and the base station could take action accordingly.

In particular, if the base station receives each such response message from the UE before expiration of the timeout period, then the base station could deem the DRB-setup process to have succeeded and could therefore send the initial-context-setup response to the control entity as noted above, to facilitate completion of the UE's attachment. Whereas, if the base station does not receive each such message from the UE by the expiration of the timeout period, then the base station could deem the DRB-setup to have failed. And in that case, rather than sending the initial-context-setup response to the control entity, the base station could send to the control entity a context-release message that directs the control entity to delete its context record for the UE, thus effectively abandoning the UE's attachment. Such failure of DRB setup could be considered a call failure (even if for a data connection).

For various reasons, in this process, certain UEs may be slow to respond to a base station's bearer-setup messages, such as a base station's security-mode-command message and/or the base station's RRC connection-reconfiguration message. This slowness could occur with certain classes of UEs, such as those manufactured by particular equipment manufacturers, or those configured in certain ways (perhaps certain models of UEs, UEs with certain firmware versions, or UEs having other particular configurations), among other possibilities. Unfortunately, with a prevalence of such UEs, this could therefore result in high call failure rates as the slow UEs may fail to respond to the base station's bearer-setup messages within the base station's defined timeout period.

Practically, the impact of a UE often experiencing such call failures could be that the UE would often need to repeat the RRC connection establishment and attachment processes, which could contribute to UE battery drain and network load and could complicate network performance metrics, making it difficult for network engineers and systems to identify other issues that may be impacting UE performance.

One solution to this problem is to configure the base station with a longer timeout period, so that whenever the base station is working to set up a DRB for a UE, the base station would tolerate a longer wait for the UE to respond to the base station's bearer-setup messages before the base station deems the DRB-setup to have failed and sends a context-release message to the control entity.

Yet having the base station apply a longer timeout period for all UEs may not be technologically prudent. At a minimum, this is because many UEs may regularly respond in a timely manner to the base station's bearer-setup messages but may be slow to respond in just isolated instances, and it may be best in those isolated instances to not extend the timeout period, so as to avoid tying up network resources any longer than necessary.

Disclosed herein is thus an improved solution. In accordance with the disclosure, the timeout period for the base station waiting for a UE's response to bearer-setup messaging from the base station will be set based on an evaluation of how often the UE (or a class of UEs of which the UE is a member) has experienced bearer-setup failures.

For instance, the base station could generally apply a default timeout period for waiting to receive bearer-setup response messaging from UEs. But for a given UE that has recently experienced a high rate of bearer-setup failures, the base station could apply a longer timeout period, to help cope with that UE's tendency to be slower to respond to the base station's bearer-setup messaging. Through this process, the base station might therefore apply different timeout periods for different UEs or classes of UEs, based on how often each such UE or class of UEs has experienced bearer-setup failures.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example wireless communication system in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that could be implemented as discrete components or in conjunction with other components, in any suitable combination and location, and that various disclosed operations could be implemented by any combination of hardware, firmware, and/or software, such as by one or more processors programmed to execute computer instructions for instance.

Figure 1:
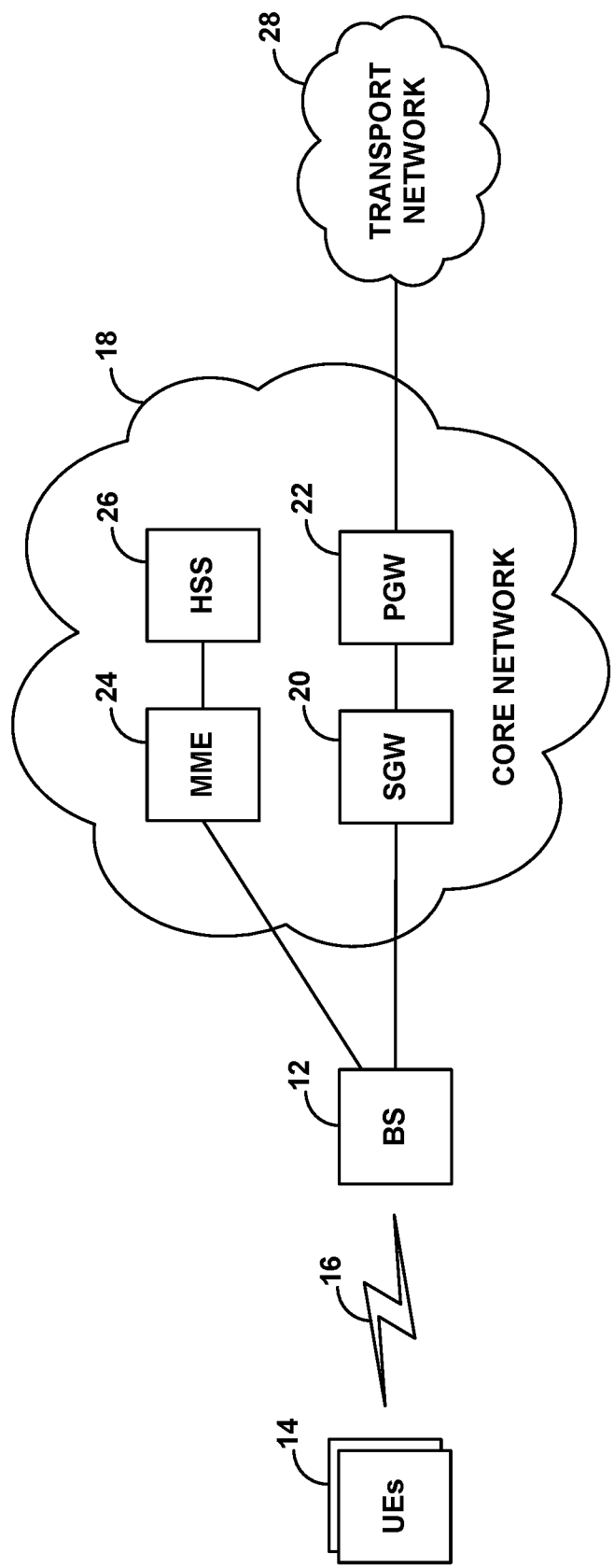
FIG. 1 is a simplified block diagram of an example wireless communication system in which aspects of the present disclosure can be implemented.

The arrangement of FIG. 1 includes by way of example a representative base station 12 and a plurality of UEs 14 within coverage of the base station 12. The base station and each UE could be configured to communicate with each other over a radio frequency air interface 16 according to any of a variety of radio access technologies, such as those noted above for instance. For sake of example, and without limitation, the remainder of this disclosure will focus on an implementation in the context of LTE.

As shown, the base station sits as a node on an example core network 18, which could be an Evolved Packet Core (EPC) supporting Internet Protocol (IP) communication over packet-switched interfaces. The example core network 18 then includes a serving gateway (SGW) 20, a packet-data-network gateway (PGW) 22, a mobility management entity (MME) 24, and a home subscriber server (HSS) 26. In practice, the base station has interfaces with the SGW and the MME, the MME has interfaces with the HSS and the SGW, the SGW has an interface with the PGW, and the PGW provides connectivity with a transport network 28 such as the Internet.

With this arrangement, when each of the UEs 14 initially enters into threshold strong coverage of the base station, the UE could engage in signaling as noted above to connect with the base station and attach with the network. In particular, the UE could engage in random access signaling and RRC signaling with the base station to establish an RRC connection with the base station. And the UE could transmit an attach request, which the base station could forward to the MME, as a representative core-network control entity, for processing.

Upon receipt of the UE'S attach request, the MME could engage in signaling with the HSS to facilitate authentication of the UE and to obtain from the HSS certain service and profile data for the UE. Further, the MME could establish in data storage a context record for the UE and could store in the context record an indication of an Evolved Packet System (EPC) bearer identity for a bearer to be established for the UE, along with service level information for the bearer.

The MME could then engage in signaling with the SGW to establish for the UE an S11 signaling tunnel between the MME and SGW, with the SGW establishing a context record for the UE, and with the MME and SGW each storing in their respective UE context record an indication of the UE's ID and an indication of each other's tunnel endpoint identifiers (TEIDs) for the S11 tunnel. Moreover, the MME's signaling with the SGW could trigger signaling between the SGW and the PGW to establish for the UE an S5 tunnel between the SGW and the PGW, with the PGW establishing a context record for the UE and assigning an IP address for the UE, and with the SGW and PGW each storing in their respective UE context record an indication of the UE's ID and each other's TEIDs for the S5 tunnel. And the SGW could provide the MME with the SGW's TEID for an S1-U tunnel to be established for the UE between the base station and the SGW.

As further discussed above, the MME could also engage in signaling with the base station to trigger setup for the UE of a DRB. In particular, the MME could transmit to the base station an initial-context-setup-request message, which could provide the base station with the SGW's TEID for the S1-U tunnel and could include an attach-accept message and an activate-bearer-request message and could specify the UE's assigned IP address, UE service/profile information, and other information. And the base station could store in its UE context record the SGW's TEID for the S1-U tunnel and could engage in DRB-setup signaling with the UE to set up a radio-bearer for the UE.

As discussed above, the DRB-setup process could involve the base station transmitting to the UE a security-mode command message providing security information for the DRB and transmitting to the UE an RRC connection-reconfiguration message directing the UE to add the DRB to the UE's RRC connection. And the RRC connection-reconfiguration message could carry the attach-accept message and the assigned IP address, among other information.

Further, as discussed above, the DRB-setup process could involve the base station waiting up to a defined timeout period for the UE to respond to each of the base station's DRB-setup messages, and the base station deeming the DRB-setup process to be either a failure or a success based on whether the base station receives each such response from the UE before the timeout period expires.

In particular, as noted above, if the base station receives the UE's response to the base station's DRB-setup messages before the timeout period expires, then for at least that reason, the base station could deem the DRB-process to be a success. Thus, the base station could then transmit to the MME an initial-context-setup-response message, providing the MME with the base station's TEID for the S1-U tunnel, so that the MME could pass that TEID to the SGW to complete setup for the UE of the S1-U tunnel between the base station and the SGW.

Whereas, if the base station does not receive the UE's response to each of the base station's DRB-setup messages before the timeout period expires, then the base station could deem the DRB-setup process to be a failure. And thus, the base station could instead transmit to the MME a context-release message, which could cause the MME to undo the bearer setup underway for the UE and to delete the context record that it had established for the UE, thus effectively abandoning the UE's attachment. Further, the base station and other entities involved in the process could likewise delete the context records that they had established for the UE.

As noted above, the present disclosure provides for dynamically setting (e.g., adjusting) the timeout period that the base station will apply on a per-UE or per-UE-class based on an evaluation of how often a UE or UEs of a class have experienced DRB-setup failures.

At issue in this evaluation could be how many times, over a recent sliding window of time, a UE or UE's of a class experienced DRB-setup failures, perhaps as a result of not transmitting to the base station a security-mode-complete message and RRC-connection-reconfiguration message before expiration of a defined timeout period.

To facilitate this evaluation, the base station could keep track of DRB-setup failures experienced by each of various UEs that have sought to connect with the base station.

Each such UE could have a UE identifier, such as an International Mobile Subscriber Identifier (IMSI) or the like, which the UE might indicate in its RRC connection request to the base station or the base station might receive in signaling from the MME. Further, each such UE could be a member of a class of UEs. For instance, each UE might be made by a particular manufacturer and/or have a particular configuration, among other class attributes, which might be indicated by the UE's service/profile information or in another manner.

For each DRB-setup failure detected by the base station, perhaps specifically for each DRB-setup failure resulting from the base station's non-receipt of the UE's DRB-setup response messages before expiration of a defined timeout period, the base station could store a record of the occurrence of that DRB-setup failure in correlation with the UE's identifier and/or in correlation with each of one or more classes of which the UE is a member. Further, the base station could include a timestamp of the DRB-setup failure with each such record.

The base station could maintain this or associated data on a sliding window basis, such as over the most recent five minutes for instance. And the base station could roll up the data. For example, the base station could establish for each UE (per UE identifier) a count of DBR-setup failures that the UE experienced within the most recent sliding window. And the base station could establish for each class of UEs an average (or other statistical measure) of counts of DBR-setup failures experienced by UEs of the class.

At the same time, the base station could also monitor each such count of DRB-setup failures over the most recent sliding window, representing a rate of DRB-setup failures for the UE or class of UEs. And the base station could detect when any such rate of DRB-setup failures is at least as high as a predefined threshold rate. The predefined threshold rate could be set by engineering design or through machine-learning or other means to be a DRB-setup-failure rate that is considered to be undesirably high. For instance, the threshold rate could be three DRB-setup failures per five minutes, among other possibilities.

Through this process, the base station could thus detect that a particular UE or a particular class of UEs has experienced DRB-setup failures too often. And in response, the base station could then increase the timeout period that the base station applies for that particular UE or for UEs of that particular class. For instance, if the base station normally applies a default timeout period of two seconds, the base station could increase the timeout period for the particular UE or the particular class of UEs to be five seconds—so as to allow more time for the particular UE or UEs of the particular class to respond to the base station's DRB-setup messages.

The base station could record adjusted timeout period for the particular UE or particular class of UEs in data storage, so that when the base station next encounters a DRB-setup process for the particular UE or the particular class of UEs, the base station could determine from the record that the base station should apply the increased timeout period rather than the default timeout period. Whereas, when the base station encounters a DRB-setup process for a UE for which the base station has not set an increased timeout period, base station could apply the default, shorter timeout period.

Note also that the base station could apply this process to set different adjusted timeout periods for different UEs or different classes of UEs. For instance, the base station could determine that a first UE has experienced DRB-setup failures at a first threshold high rate, and the base station could responsively set a first increased timeout period to apply for that first UE. And the base station could determine that a second UE has experienced DRB-setup failures at a second threshold high rate higher than the first threshold high rate, and the base station could responsively set a second increased timeout period longer than the first increased time period to apply for that second UE. And the base station could carry out similar operations for different classes of UEs.

Further, note that when the base station sets itself an adjusted timeout period to apply for a UE or a class of UEs, the base station could set itself to do so for a defined adjustment period and could automatically revert to set itself to apply the default timeout period for the UE or class of UEs upon expiration of the adjustment period. This adjustment period could be on the order of one hour or so. Moreover, during the adjustment period, the base station could continue to record any instances of DRB-setup failures experienced by the UE or class of UEs at issue. And in that process, if the base station finds that the UE or class of UEs experiences a threshold high rate of DRB-setup failures, the base station could further increase the timeout period that the base station applies for the UE or class of UEs or could take other action, such as generating and outputting an alert regarding the issue.

In addition, while the above discussion focuses on the base station conducting the DRB-setup-failure-rate analysis, one or more other entities of the wireless communication system (whether or not shown and discussed above) could carry out that analysis. For example, in an alternative implementation, the MME could similarly track DRB-setup failures per UE or class of UEs as the MME receives context-release messages rather than initial-context-setup-response messages from the base station. And the MME could similarly detect when the DRB-setup-failure rate for a particular UE or class of UEs is threshold high and upon detecting that, the MME could signal to the base station to direct the base station to apply an increased timeout period in waiting for DRB-setup-response messages from that UE or UEs of that class, likewise for an adjustment period of time for instance. And the base station could thus set itself to apply the increased time period for the UE or UEs of the class as directed.

Figure 2:
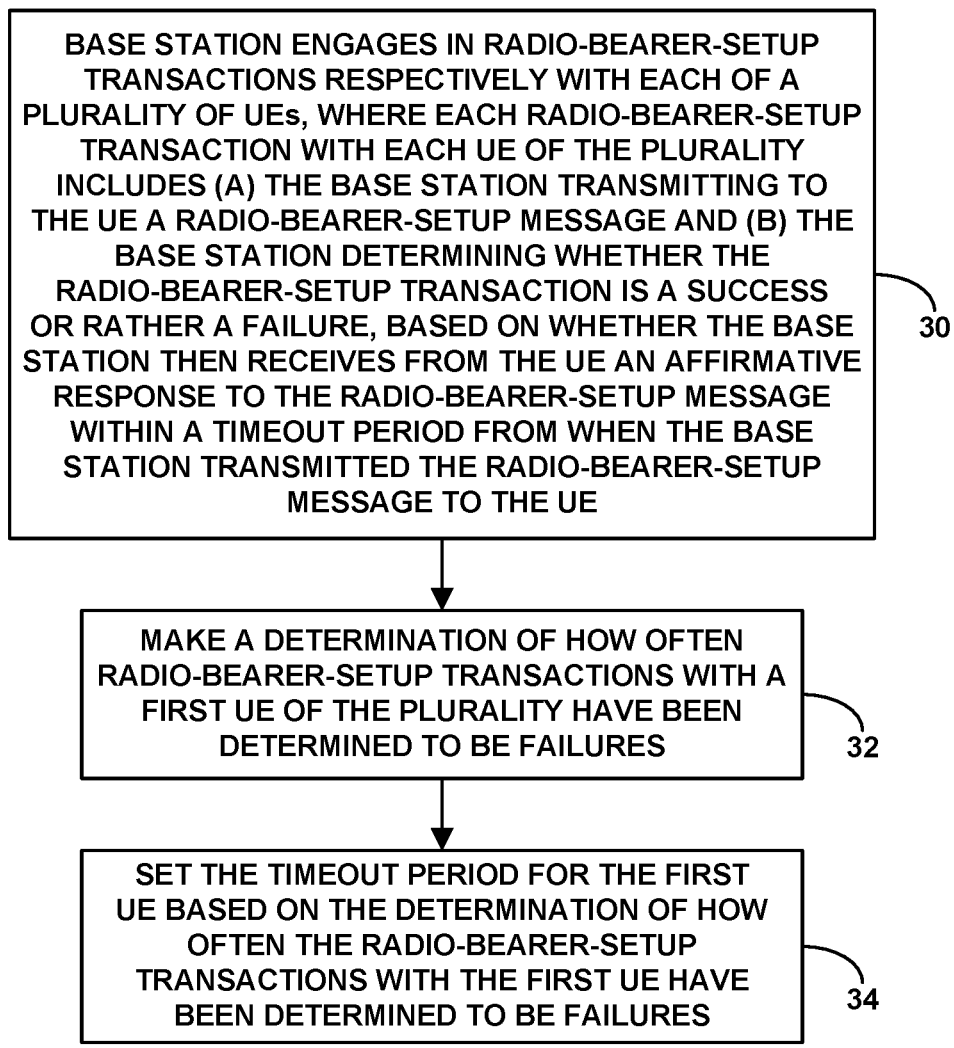
FIG. 2 is a flow chart depicting operations that can be carried out in accordance with the disclosure.

FIG. 2 is next a flow chart depicting a method that can be carried out in accordance with the present disclosure. This method could help control radio-bearer setup (e.g., DRB setup) and UE attachment, by dynamically controlling the timeout period that a base station applies for determining whether a radio-bearer-setup failure has occurred.

As shown in FIG. 2, at block 30, the method includes a base station engaging in radio-bearer-setup transactions respectively with each of a plurality of UEs, where each radio-bearer-setup transaction with each UE of the plurality includes (a) the base station transmitting to the UE a radio-bearer-setup message and (b) the base station determining whether the radio-bearer-setup transaction is a success or rather a failure, based on whether the base station then receives from the UE an affirmative response to the radio-bearer-setup message within a timeout period from when the base station transmitted the radio-bearer-setup message to the UE. Further, at block 32, the method includes making a determination of how often radio-bearer-setup transactions with a first UE of the plurality have been determined to be failures and, at block 34, the base station setting the timeout period for the first UE (i.e., to apply in radio-bearer-setup for the UE) based on the determination of how often the radio-bearer-setup transactions with the first UE have been determined to be failures.

In line with the discussion above, the radio-bearer-setup message that the base station transmits in each radio-bearer-setup transaction with a UE could be a security-mode-command message that provides the UE security information useable to facilitate secure radio-bearer communication between the UE and the base station, and the affirmative response from the UE could be a security-mode-complete message. Alternatively or additionally, the radio-bearer-setup message could be an RRC connection-reconfiguration message that directs the UE to add one or more radio bearers to a connection between the UE and the base station, and affirmative response from the UE could be an RRC connection-reconfiguration-complete message.

Further, as discussed above, the act of the base station determining if the radio-bearer-setup transaction is a success or rather a failure based on whether the base station receives from the UE an affirmative response to the radio-bearer-setup message within a timeout period from when the base station transmitted the radio-bearer-setup message to the UE could involve (i) the base station applying a timer for the timeout period from when the base station transmits the radio-bearer-setup message to the UE, (ii) the base station making a determination of whether the base station receives from the UE the affirmative response to the radio-bearer-setup message before the timer expires, (iii) if the determination is affirmative, then, based at least in part on the determination, the base station deeming the radio-bearer-setup transaction to be a success rather than a failure, and (iv) if the determination is negative, then, based at least in part on the determination, the base station deeming the radio-bearer-setup transaction to be a failure rather than a success.

Yet further, the act of making the determination of how often radio-bearer-setup transactions with the first UE of the plurality have been determined to be failures could involve the base station determining how often the base station has determined radio-bearer-setup transactions with the first UE have been failures. Alternatively or additionally, the act of making the determination of how often radio-bearer-setup transactions with the first UE of the plurality have been determined to be failures could involve the core-network control entity determining how often the core-network control entity has received context-release messages triggering abandonment of attachment of the first UE.

Still further, as discussed above, the base station could engage in each radio-bearer-setup transaction with a UE in response to the base station receiving from a core-network control entity an initial-context-setup-request message in relation to attachment of the UE. And in that case, if the base station determines the radio-bearer-setup transaction with the UE to be a success, then the base station could transmit to the core-network control entity an initial-context-setup-response to facilitate successful completion of the attachment rather than transmitting to the core-network control entity a context-release message to trigger abandonment of the attachment. Whereas, if the base station deems the radio-bearer-setup transaction with the UE to be a failure, then the base station could transmit to the core-network control entity the context-release message to trigger abandonment of the attachment rather than transmitting to the core-network control entity the initial-context-setup-response message to facilitate successful completion of the attachment.

In addition, as discussed above, the act of making the determination of how often radio-bearer-setup transactions with the first UE have been determined to be failures is done over a sliding window of time.

Further, as discussed above, the base station could be set to apply a default timeout period to determine whether the base station receives from a UE an affirmative response to the radio-bearer-setup message soon enough, and the act of setting the timeout period for the first UE based on the determination of how often the radio-bearer-setup transactions with the first UE have been determined to be failures could involve increasing the timeout period for the first UE from the default time period to a timeout period longer than the default timeout period based on the determination being that the radio-bearer-setup transactions with the first UE have been determined to be failures at at least a predefined threshold rate. And the method could additionally include, after increasing the timeout period for the first UE to be the longer timeout period, the base station automatically reverting the timeout period for the first UE to be the default timeout period after a predefined adjustment period.

Yet further, as discussed above, the method could additionally involve the base station or another entity making a determination of how often radio-bearer-setup transactions with a second UE of the plurality have been determined to be failures, and the base station setting the timeout period for the second UE based on the determination of how often the radio-bearer-setup transactions with the second UE have been determined to be failures, where the timeout period for the second UE is set to a different duration than the timeout period for the first UE.

Figure 3:
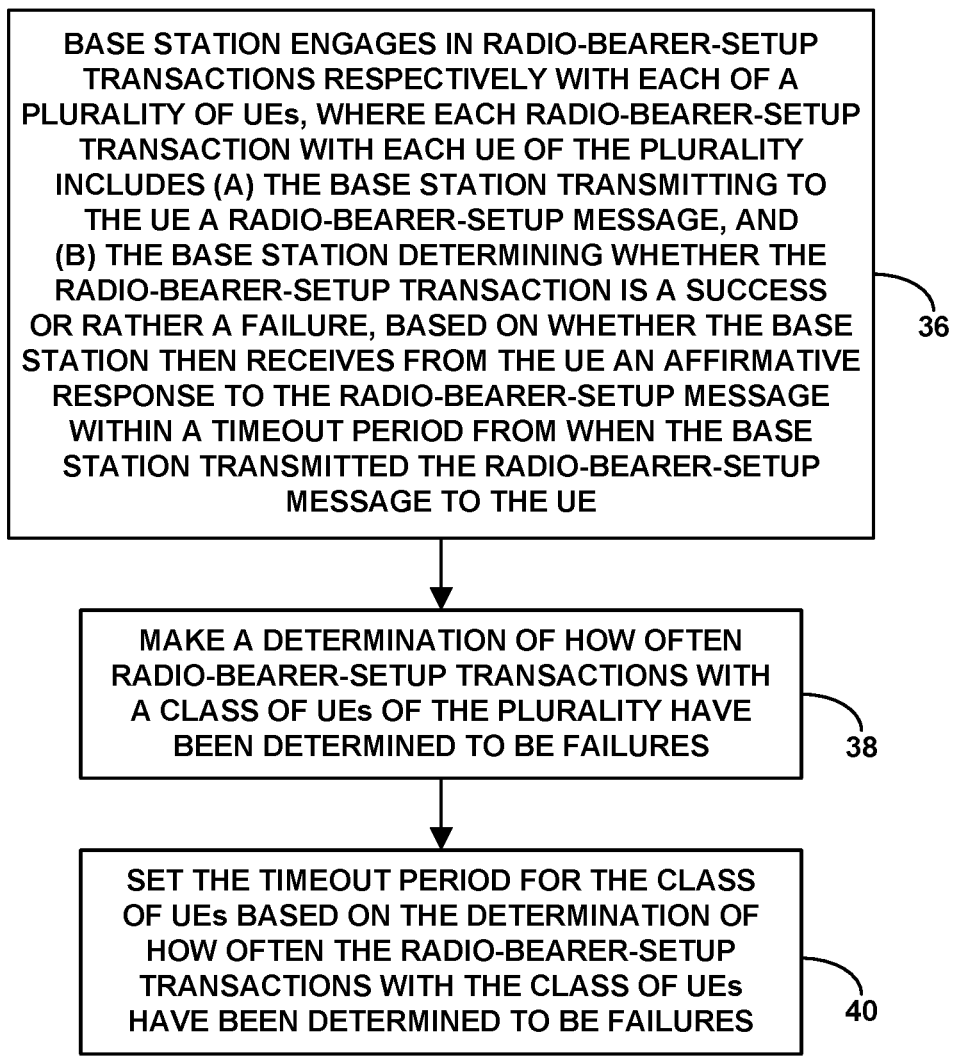
FIG. 3 is another flow chart depicting operations that can be carried out in accordance with the disclosure.

FIG. 3 is next another flow chart depicting a method that can be carried out in accordance with the present disclosure. This method could likewise help control radio-bearer setup (e.g., DRB setup) and UE attachment, by dynamically controlling the timeout period that a base station applies for determining whether a radio-bearer-setup failure has occurred.

As shown in FIG. 3, at block 36, the method includes a base station engaging in radio-bearer-setup transactions respectively with each of a plurality of UEs, where each radio-bearer-setup transaction with each UE of the plurality includes (a) the base station transmitting to the UE a radio-bearer-setup message, and (b) the base station determining whether the radio-bearer-setup transaction is a success or rather a failure, based on whether the base station then receives from the UE an affirmative response to the radio-bearer-setup message within a timeout period from when the base station transmitted the radio-bearer-setup message to the UE. Further, at block 38, the method includes making a determination of how often radio-bearer-setup transactions with a class of UEs of the plurality (i.e., with UEs of the class) have been determined to be failures. And at block 40, the method includes the base station setting the timeout period for the class of UEs (i.e., to apply for UEs that are members of the class of UEs) based on the determination of how often the radio-bearer-setup transactions with the class of UEs have been determined to be failures.

As discussed above, the class of UEs could take various forms. For example, and without limitation, the class could be UEs manufactured by a particular equipment manufacturer and/or UEs of a particular configuration.

Further, other features discussed above can be applied in this context, and vice versa.

Figure 4:
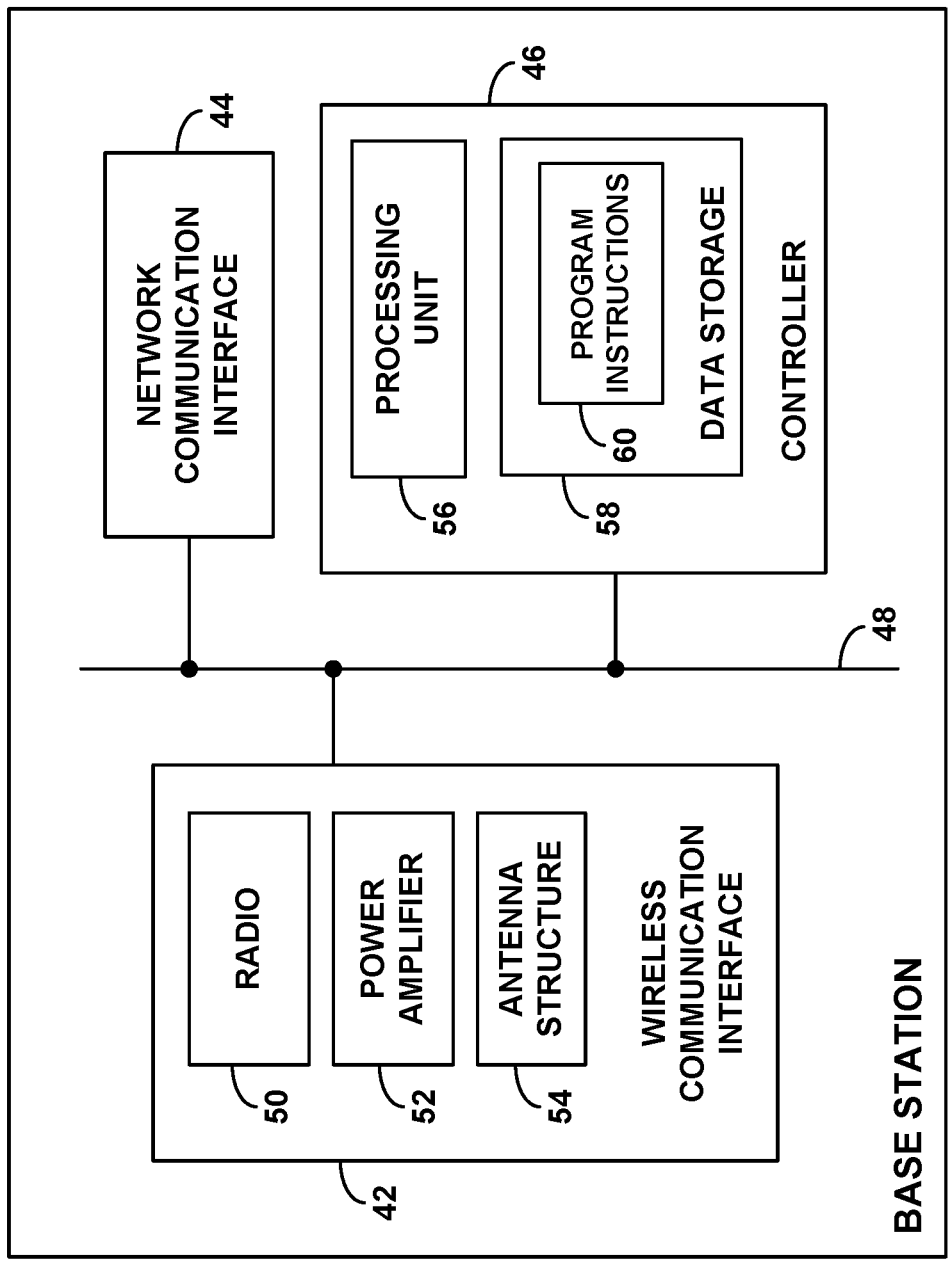
FIG. 4 is a simplified block diagram of an example base station operable in accordance with the disclosure.

FIG. 4 is next a simplified block diagram of an example base station operable in accordance with the disclosure. As shown in FIG. 4, the example base station includes a wireless communication interface 42, a network communication interface 44, and a controller 46, all of which could be communicatively linked together by a system bus, network, or one or more other communication mechanisms 48 and/or could be integrated together in various ways.

Wireless communication interface 42 includes a radio 50, a power amplifier 52, and antenna structure 54. The radio could operate to interface between encoded baseband signals and RF signals. The power amplifier could operate to amplify signals. And the antenna structure 54 could comprise a plurality of antennas (e.g., an antenna array) through which the base station can communicate wirelessly with UEs in accordance with a radio access technology.

Network communication interface 44 could include a wired or wireless Ethernet interface or other such mechanism through which the base station could communicate with various other network entities on a core network, such as with an SGW and an MME for instance.

And controller 46 could comprise at least one processing unit 56 (e.g., one or more microprocessors or other processors), non-transitory data storage 58 (e.g., one or more volatile and/or non-volatile storage components, such as magnetic, optical, or flash storage), and program instructions 60 stored in the data storage and executable by the processing unit to cause the base station to carry out various operations described herein, such as the operations described with respect to the flow charts of FIGS. 2 and 3.

By way of example, the operations could include engaging in radio-bearer-setup transactions respectively with each of a plurality of the UEs, where each radio-bearer-setup transaction with each UE of the plurality includes (a) the base station transmitting to the UE, through the wireless communication interface, a radio-bearer-setup message, and (b) the base station determining whether the radio-bearer-setup transaction is a success or rather a failure, based on whether the base station then receives from the UE, through the wireless communication interface, an affirmative response to the radio-bearer-setup message within a timeout period from when the base station transmitted the radio-bearer-setup message to the UE.

Further, the operations could include making a determination of how often radio-bearer-setup transactions with one or more of the UEs have been determined to be failures, and setting the timeout period for the one or more UEs based on the determination of how often the radio-bearer-setup transactions with the one or more UEs have been determined to be failures.

Various features discussed above can be incorporated in this context and vice versa. For instance, the radio-bearer-setup message at issue could be a security-mode-command message and/or an RRC connection-reconfiguration message, and the affirmative response from the UE could thus be a security-mode-complete message and/or an RRC connection-reconfiguration-complete message. Further, each such radio-bearer-setup transaction could be responsive to an initial-context-setup-request message in relation to UE attachment, and the base station could return an initial-context-setup-response if the base station determines the radio-bearer-setup transaction to be a success or with a context-release message if the base station determines the radio-bearer-setup transaction to be a failure.

Figure 5:
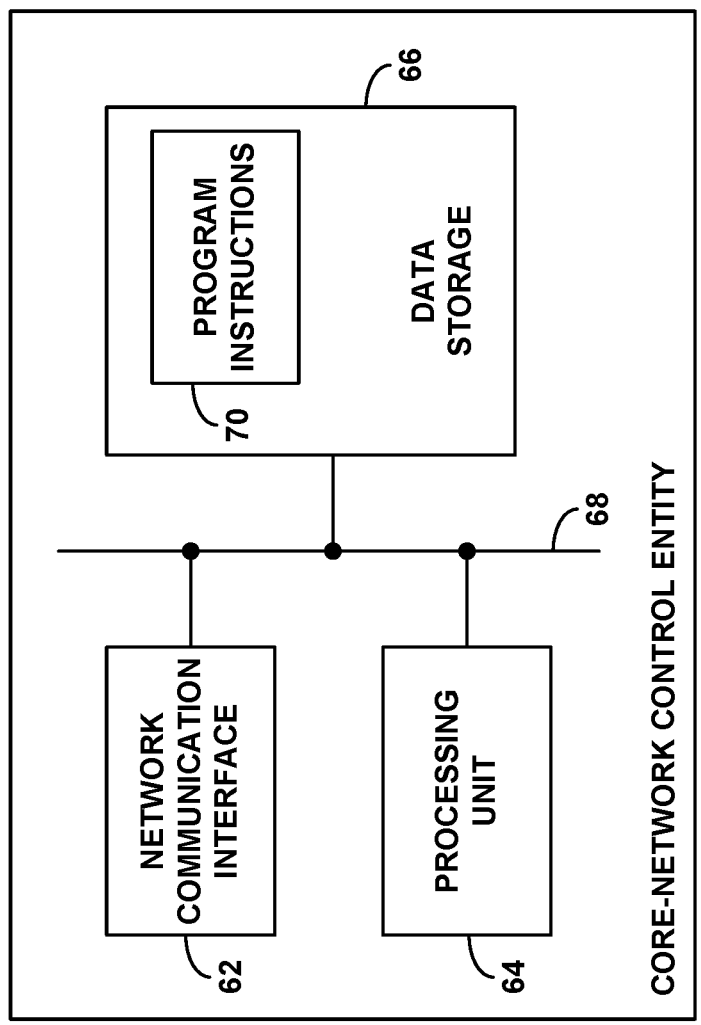
FIG. 5 is a simplified block diagram of an example core-network control entity operable in accordance with the disclosure.

Finally, FIG. 5 is a simplified block diagram of an example core-network control entity, such as an MME, operable in accordance with the disclosure. As shown, the example control entity includes a network communication interface 62, a processing unit 64, and non-transitory data storage 66, which could be communicatively linked together by a system bus, network, or one or more other communication mechanisms 68 and/or could be integrated together in various ways. And as shown, data storage 66 could hold program instructions 70, which could be executable by the processing unit 64 to carry out various control-entity operations described above.

Note also that the present disclosure contemplates as a separate implementation a computer-readable medium that stores, is encoded with, or otherwise embodies program instructions or the like executable to carry out various features described above, such as to cause one or more entities to carry out the operations described above.

Exemplary embodiments have been described above. Those skilled in the art will understand, however, that changes and modifications may be made to these embodiments without departing from the true scope and spirit of the invention.

We claim:

1. A method comprising:
    engaging by a base station in radio-bearer-setup transactions respectively with each of a plurality of user equipment devices (UEs), wherein each radio-bearer-setup transaction with each UE of the plurality includes (a) the base station transmitting to the UE a radio-bearer-setup message and (b) the base station determining whether the radio-bearer-setup transaction is a success or rather a failure, based on whether the base station then receives from the UE an affirmative response to the radio-bearer-setup message within a timeout period from when the base station transmitted the radio-bearer-setup message to the UE;
    making a determination of how often radio-bearer-setup transactions with a first UE of the plurality have been determined to be failures; and
    setting by the base station the timeout period for the first UE based on the determination of how often the radio-bearer-setup transactions with the first UE have been determined to be failures.

2. The method of claim 1,
    wherein the radio-bearer-setup message that the base station transmits in each radio-bearer-setup transaction with a UE is a security-mode-command message that provides the UE security information useable to facilitate secure radio-bearer communication between the UE and the base station, and
    wherein the affirmative response from the UE is a security-mode-complete message.

3. The method of claim 1,
    wherein the radio-bearer-setup message that the base station transmits in each radio-bearer-setup transaction with a UE is a Radio Resource Control (RRC) connection-reconfiguration message that directs the UE to add one or more radio bearers to a connection between the UE and the base station, and
    wherein the affirmative response from the UE is an RRC connection-reconfiguration-complete message.

4. The method of claim 1, wherein the base station determining if the radio-bearer-setup transaction is a success or rather a failure, based on whether the base station then receives from the UE an affirmative response to the radio-bearer-setup message within a timeout period from when the base station transmitted the radio-bearer-setup message to the UE comprises:
    the base station applying a timer for the timeout period from when the base station transmits the radio-bearer-setup message to the UE;
    the base station making a determination of whether the base station receives from the UE the affirmative response to the radio-bearer-setup message before the timer expires;
    if the determination is affirmative, then, based at least in part on the determination, the base station deeming the radio-bearer-setup transaction to be a success rather than a failure; and
    if the determination is negative, then, based at least in part on the determination, the base station deeming the radio-bearer-setup transaction to be a failure rather than a success.

5. The method of claim 1, wherein making the determination of how often radio-bearer-setup transactions with the first UE of the plurality have been determined to be failures comprises the base station determining how often the base station has determined radio-bearer-setup transactions with the first UE have been failures.

6. The method of claim 1, wherein the base station engages in each radio-bearer-setup transaction with a UE in response to the base station receiving from a core-network control entity an initial-context-setup-request message in relation to attachment of the UE,
    wherein, if the base station determines the radio-bearer-setup transaction with the UE to be a success, then the base station transmits to the core-network control entity an initial-context-setup-response to facilitate successful completion of the attachment rather than transmitting to the core-network control entity a context-release message to trigger abandonment of the attachment, and
    wherein, if the base station deems the radio-bearer-setup transaction with the UE to be a failure, then the base station transmits to the core-network control entity the context-release message to trigger abandonment of the attachment rather than transmitting to the core-network control entity the initial-context-setup-response message to facilitate successful completion of the attachment.

7. The method of claim 1, wherein making the determination of how often radio-bearer-setup transactions with the first UE of the plurality have been determined to be failures comprises the core-network control entity determining how often the core-network control entity has received context-release messages triggering abandonment of attachment of the first UE.

8. The method of claim 1, wherein making the determination of how often radio-bearer-setup transactions with the first UE have been determined to be failures is done over a sliding window of time.

9. The method of claim 1, wherein the base station is configured to apply a default timeout period to determine whether the base station receives from a UE an affirmative response to the radio-bearer-setup message soon enough, and wherein setting the timeout period for the first UE based on the determination of how often the radio-bearer-setup transactions with the first UE have been determined to be failures comprises increasing the timeout period for the first UE from the default time period to a timeout period longer than the default timeout period based on the determination being that the radio-bearer-setup transactions with the first UE have been determined to be failures at at least a predefined threshold rate.

10. The method of claim 9, further comprising:
after increasing by the base station the timeout period for the first UE to be the longer timeout period, automatically reverting by the base station the timeout period for the first UE to be the default timeout period after a predefined adjustment period.

11. The method of claim 1, further comprising:
making a determination of how often radio-bearer-setup transactions with a second UE of the plurality have been determined to be failures; and
setting by the base station the timeout period for the second UE based on the determination of how often the radio-bearer-setup transactions with the second UE have been determined to be failures, wherein the timeout period for the second UE is set to a different duration than the timeout period for the first UE.

12. A method comprising:
engaging by a base station in radio-bearer-setup transactions respectively with each of a plurality of user equipment devices (UEs), wherein each radio-bearer-setup transaction with each UE of the plurality includes (a) the base station transmitting to the UE a radio-bearer-setup message, and (b) the base station determining whether the radio-bearer-setup transaction is a success or rather a failure, based on whether the base station then receives from the UE an affirmative response to the radio-bearer-setup message within a timeout period from when the base station transmitted the radio-bearer-setup message to the UE;
making a determination of how often radio-bearer-setup transactions with a class of UEs of the plurality have been determined to be failures; and
setting by the base station the timeout period for the class of UEs based on the determination of how often the radio-bearer-setup transactions with the class of UEs have been determined to be failures.

13. The method of claim 12, wherein the class of UEs is selected from the group consisting of (i) UEs manufactured by a particular equipment manufacturer, and (ii) UEs of a particular configuration.

14. The method of claim 12,
wherein the radio-bearer-setup message that the base station transmits in each radio-bearer-setup transaction with a UE is a security-mode-command message that provides the UE security information useable to facilitate secure radio-bearer communication between the UE and the base station, and
wherein the affirmative response from the UE is a security-mode-complete message.

15. The method of claim 12,
wherein the radio-bearer-setup message that the base station transmits in each radio-bearer-setup transaction with a UE is a Radio Resource Control (RRC) connection-reconfiguration message that directs the UE to add one or more radio bearers to a connection between the UE and the base station, and
wherein the affirmative response from the UE is an RRC connection-reconfiguration-complete message.

16. The method of claim 12, wherein the base station engages in each radio-bearer-setup transaction with a UE in response to the base station receiving from a core-network control entity an initial-context-setup-request message in relation to attachment of the UE,
wherein, if the base station determines the radio-bearer-setup transaction with the UE to be a success, then the base station transmits to the core-network control entity an initial-context-setup-response to facilitate successful completion of the attachment rather than transmitting to the core-network control entity a context-release message to trigger abandonment of the attachment, and
wherein, if the base station deems the radio-bearer-setup transaction with the UE to be a failure, then the base station transmits to the core-network control entity the context-release message to trigger abandonment of the attachment rather than transmitting to the core-network control entity the initial-context-setup-response message to facilitate successful completion of the attachment.

17. A base station comprising:
an wireless communication interface, including an antenna structure, through which to communicate wirelessly with user equipment devices (UEs);
a network communication interface through which to communicate on a core network; and
a controller, comprising at least one processing unit, data storage, and program instructions stored in the data storage and executable by the processing unit to cause the base station to carry out operations including:
engaging in radio-bearer-setup transactions respectively with each of a plurality of the UEs, wherein each radio-bearer-setup transaction with each UE of the plurality includes (a) the base station transmitting to the UE, through the wireless communication interface, a radio-bearer-setup message, and (b) the base station determining whether the radio-bearer-setup transaction is a success or rather a failure, based on whether the base station then receives from the UE, through the wireless communication interface, an affirmative response to the radio-bearer-setup message within a timeout period from when the base station transmitted the radio-bearer-setup message to the UE,
making a determination of how often radio-bearer-setup transactions with one or more of the UEs have been determined to be failures, and
setting the timeout period for the one or more UEs based on the determination of how often the radio-bearer-setup transactions with the one or more UEs have been determined to be failures.

18. The base station of claim 17,
wherein the radio-bearer-setup message that the base station transmits in each radio-bearer-setup transaction with a UE is a security-mode-command message that provides the UE security information useable to facilitate secure radio-bearer communication between the UE and the base station, and wherein the affirmative response from the UE is a security-mode-complete message.

19. The base station of claim 17, wherein the radio-bearer-setup message that the base station transmits in each radio-bearer-setup transaction with a UE is a Radio Resource Control (RRC) connection-reconfiguration message that directs the UE to add one or more radio bearers to a connection between the UE and the base station, and wherein the affirmative response from the UE is an RRC connection-reconfiguration-complete message.

20. The base station of claim 17, wherein the base station engages in each radio-bearer-setup transaction with a UE in response to the base station receiving from a core-network control entity, through the network communication interface, an initial-context-setup-request message in relation to attachment of the UE, the operations further comprising:

if the base station determines the radio-bearer-setup transaction with the UE to be a success, then transmitting to the core-network control entity an initial-context-setup-response to facilitate successful completion of the attachment rather than transmitting to the core-network control entity a context-release message to trigger abandonment of the attachment; and if the base station deems the radio-bearer-setup transaction with the UE to be a failure, then transmitting to the core-network control entity the context-release message to trigger abandonment of the attachment rather than transmitting to the core-network control entity the initial-context-setup-response message to facilitate successful completion of the attachment.

* * * * *